(12) United States Patent
Jones

(10) Patent No.: US 11,752,617 B2
(45) Date of Patent: Sep. 12, 2023

(54) LOW PROFILE CHAINSAW WALL MOUNT

(71) Applicant: Brian Robert Jones, Elmwood, IL (US)

(72) Inventor: Brian Robert Jones, Elmwood, IL (US)

( * ) Notice: Subject to any disclaimer, the term of this patent is extended or adjusted under 35 U.S.C. 154(b) by 103 days.

(21) Appl. No.: 17/445,647

(22) Filed: Aug. 23, 2021

(65) Prior Publication Data

US 2022/0118600 A1  Apr. 21, 2022

Related U.S. Application Data

(60) Provisional application No. 63/092,944, filed on Oct. 16, 2020.

(51) Int. Cl.
*B25H 3/00* (2006.01)
*F16M 13/02* (2006.01)

(52) U.S. Cl.
CPC ............. *B25H 3/006* (2013.01); *F16M 13/02* (2013.01)

(58) Field of Classification Search
CPC .......... F16B 45/00; F16M 13/02; B25H 3/006
See application file for complete search history.

(56) References Cited

U.S. PATENT DOCUMENTS

| | | | |
|---|---|---|---|
| 1,141,867 A * | 6/1915 | Daugherty et al. | A47L 13/512 248/113 |
| 1,730,979 A * | 10/1929 | Liebchen | A47H 19/00 160/349.2 |
| 1,980,918 A * | 11/1934 | Hudspeth | A47H 19/00 24/698.2 |
| 3,884,055 A * | 5/1975 | Vuillemot | B60D 1/60 280/507 |
| 4,450,989 A * | 5/1984 | Bogar, Jr. | A47B 81/005 224/571 |
| 4,473,176 A | 9/1984 | Harper | |
| 4,596,334 A * | 6/1986 | Daulton | B60R 7/14 211/8 |
| 4,657,234 A | 4/1987 | Stout | |
| 4,696,405 A * | 9/1987 | Waring | F41A 23/18 211/64 |
| 4,776,471 A * | 10/1988 | Elkins | A47B 57/52 224/482 |
| 4,880,192 A * | 11/1989 | Vom Braucke | A47L 13/512 211/89.01 |
| 5,007,568 A | 4/1991 | Da Vault | |
| 5,094,417 A * | 3/1992 | Creed | A47G 29/083 248/339 |
| 5,205,422 A | 4/1993 | Morris | |
| 5,372,346 A * | 12/1994 | Upchurch | F16B 21/04 D6/567 |

(Continued)

*Primary Examiner* — Eret C McNichols
(74) *Attorney, Agent, or Firm* — Dunlap Bennett & Ludwig, PLLC; Anna L. Kinney

(57) ABSTRACT

A chainsaw hanger has a flat face with a J-shaped support arm extending perpendicular to and vertically downward from the face, curving to form a horizontal portion parallel to and spaced laterally from the face, and a vertical portion extending upward towards and spaced laterally from a bottom surface of the face. The chainsaw hanger supports a chain saw in a vertical position abutting a wall. The support arm of a lockable chainsaw hanger has a pair of apertures spaced to accommodate a U-shaped rod having legs extending downward. One leg is slidably and rotatably secured within the support arm.

6 Claims, 8 Drawing Sheets

(56) References Cited

U.S. PATENT DOCUMENTS

| | | | |
|---|---|---|---|
| 5,524,772 A * | 6/1996 | Simmons | A47B 81/005 211/4 |
| 5,594,419 A * | 1/1997 | Lo | G08B 13/1472 340/693.8 |
| 5,853,092 A | 12/1998 | Goodman et al. | |
| 6,079,679 A * | 6/2000 | Mitchell | B60R 11/00 248/301 |
| 6,481,583 B1 | 11/2002 | Black et al. | |
| 6,648,152 B2 | 11/2003 | Bermes | |
| 6,971,614 B2 | 12/2005 | Fischer et al. | |
| 7,798,463 B2 | 9/2010 | Morgenroth | |
| 8,028,966 B2 | 10/2011 | Chen | |
| 8,839,998 B1 | 9/2014 | Robinson | |
| 9,010,007 B2 * | 4/2015 | Chandler | F41A 23/18 42/70.07 |
| 9,180,591 B2 | 11/2015 | McLean | |
| 9,339,153 B1 * | 5/2016 | Chang | A47K 10/12 |
| 10,449,690 B1 | 10/2019 | Plante | |
| 10,660,432 B2 * | 5/2020 | Trujillo | F16B 5/002 |
| 10,669,084 B1 * | 6/2020 | Keegan | B65D 7/14 |
| 10,729,244 B2 * | 8/2020 | Hansen, II | A47F 5/0807 |
| 11,305,413 B2 * | 4/2022 | Zhou | F16B 45/00 |
| 11,465,272 B1 * | 10/2022 | Date | B25H 3/006 |
| 2007/0063120 A1 * | 3/2007 | Robbins | E06C 7/146 248/304 |
| 2007/0251904 A1 * | 11/2007 | Winig | A47B 96/06 211/106.01 |
| 2008/0053930 A1 | 3/2008 | Rohde | |
| 2008/0164400 A1 | 7/2008 | Beechinor | |
| 2014/0361136 A1 * | 12/2014 | Smith | F16B 47/006 248/363 |
| 2018/0313468 A1 * | 11/2018 | Bartos | F16B 45/00 |
| 2018/0360206 A1 * | 12/2018 | Trujillo | F16B 5/0088 |
| 2020/0359775 A1 | 11/2020 | Heinemark et al. | |
| 2021/0237304 A1 * | 8/2021 | Enriquez | B27B 17/0008 |
| 2022/0118600 A1 * | 4/2022 | Jones | B25H 3/006 |

* cited by examiner

LOW PROFILE CHAINSAW WALL MOUNT

CROSS-REFERENCE TO RELATED APPLICATION

This application claims the benefit of priority of U.S. provisional application No. 63/092,944, filed Oct. 16, 2020, the contents of which are herein incorporated by reference.

BACKGROUND OF THE INVENTION

The present invention relates to a chainsaw wall mount and, more particularly, to a low-profile chainsaw wall mount.

Chainsaws are difficult to safely and conveniently store. Chainsaws stored on the floor can be dangerous if tripped over and when stored on a shelf they take up too much room. A wall mount comprising a metal rod sticking out several inches from the wall is dangerous and can get in the way just as much a saw on the floor. Even without the saw on the mount, the mount still protrudes from the wall. Moreover, one end of the saw generally rests higher because the saw is generally heavier on one end due to a larger bar and chain that changes the counterweight.

As can be seen, there is a need for a safe way to store chainsaws that saves space.

SUMMARY OF THE INVENTION

In one aspect of the present invention, a chainsaw hanger is provided, comprising a substantially planar face with a substantially J-shaped support arm extending perpendicular to the substantially planar face and vertically downward therefrom, curving to form a horizontal portion parallel to and spaced laterally from the substantially planar face, and a vertical portion extending upward towards a bottom surface of the substantially planar face and spaced laterally therefrom.

In another aspect of the present invention, a lockable chainsaw hanger is provided, comprising a substantially planar face with a substantially J-shaped support arm extending perpendicular to the substantially planar face and vertically downward therefrom, curving to form a horizontal portion parallel to and spaced laterally from the substantially planar face, and a vertical portion extending upward towards a bottom surface of the substantially planar face and spaced laterally therefrom; wherein the J-shaped support arm has a pair of apertures spaced to accommodate a U-shaped rod having a first leg and a second leg extending downward from the J-shaped support arm and wherein the first leg is slidably and rotatably secured within the J-shaped support arm.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a chainsaw hanger with a very low profile, only protruding from the wall by a few inches.

The mount is very robust and secures the saw to the wall. The saw hangs resting on the wall instead of hanging several inches away from the wall. The wall helps to stabilize the chainsaw. The inventive mount substantially eliminates counterbalancing issues. It can accommodate any size of bar if the mount is hung high enough.

The inventive mount clears up previously used space and helps to organize the space. Additionally, it keeps the area safe from tripping over or onto chainsaws. When the mount is not used, it generally is not in the way because it is so low profile.

In some embodiments, a chain and bar holder may be added.

A method of using the inventive mount follows. The user may mount the chainsaw hanger to the wall or inside of vehicle, e.g., with two screws via mounting holes on the chainsaw hanger. After it is hung on the wall, the user may simply slide the back end of the chainsaw handle up and over the hanger's hook.

The materials and methods of manufacture are not particularly limited. The hanger may be made of a plastic resin, for example, by a method such as injection molding, three-dimensional (3D) printing, or a computer numerical control (CNC) metal mill machine.

In some embodiments, the chainsaw hanger is adapted to securely hold the saw on the mount with a spring-loaded U-shaped component, e.g., when mounted in a vehicle or transport trailer. The U-shaped component is effective to prevent a saw from bouncing off the mount arm during transport. In some cases, a padlock may be added to prevent unauthorized access.

Referring to FIGS. 1 through 12, FIGS. 1 and 2 show a chainsaw wall mount hanger 10 according to an embodiment of the present invention. The wall mount hanger 10 has a substantially rectangular, substantially planar face 12 with mounting holes 16 formed therein and a support arm 14 extending therefrom. The support arm 14 extends perpendicularly to and vertically downward from the face 12, curving to form a parallel horizontal portion spaced laterally from and curving upward towards a bottom surface of the face into a substantially "J" shape with an end forming a square surface with rounded edges.

Figure 1:
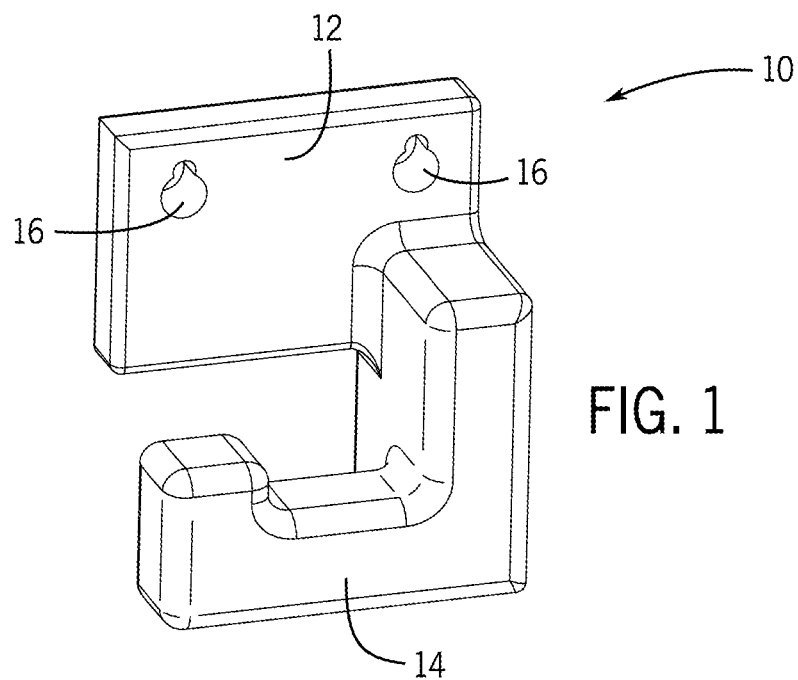
FIG. 1 is a front top perspective view of a wall mount according to an embodiment of the present invention.
Figure 2:
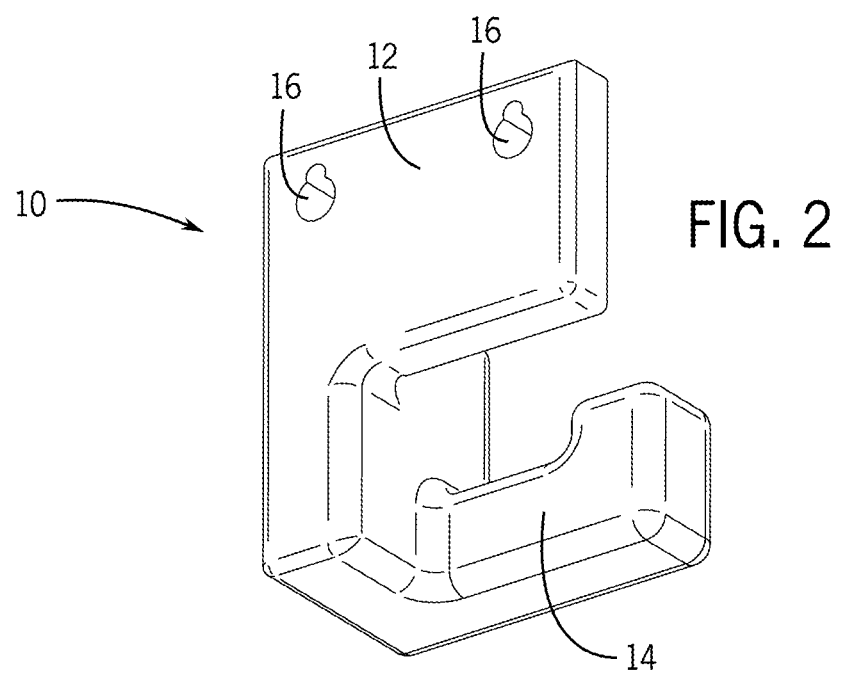
FIG. 2 is a rear bottom perspective view thereof.
Figure 3:
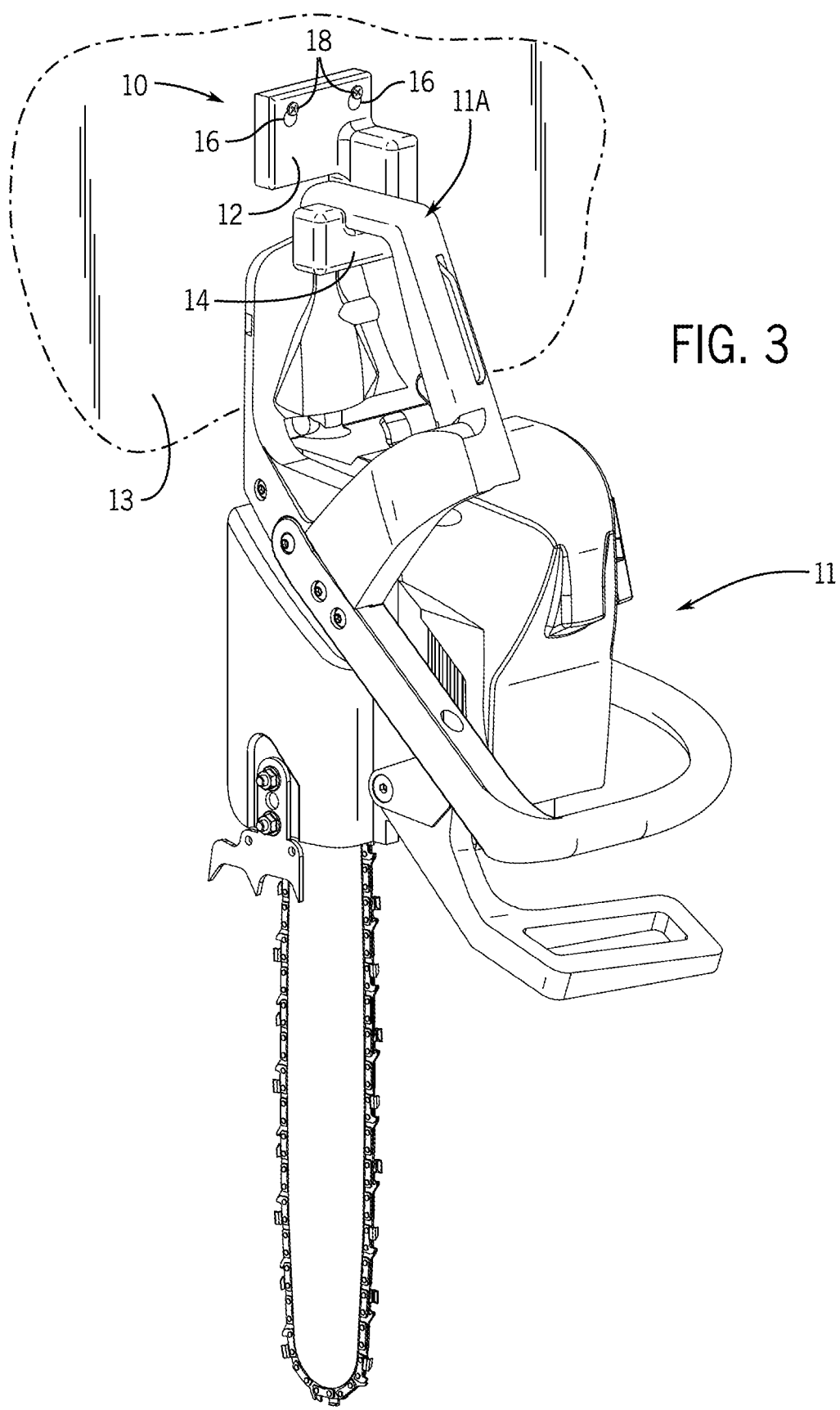
FIG. 3 is a perspective view thereof, shown in use.
Figure 4:
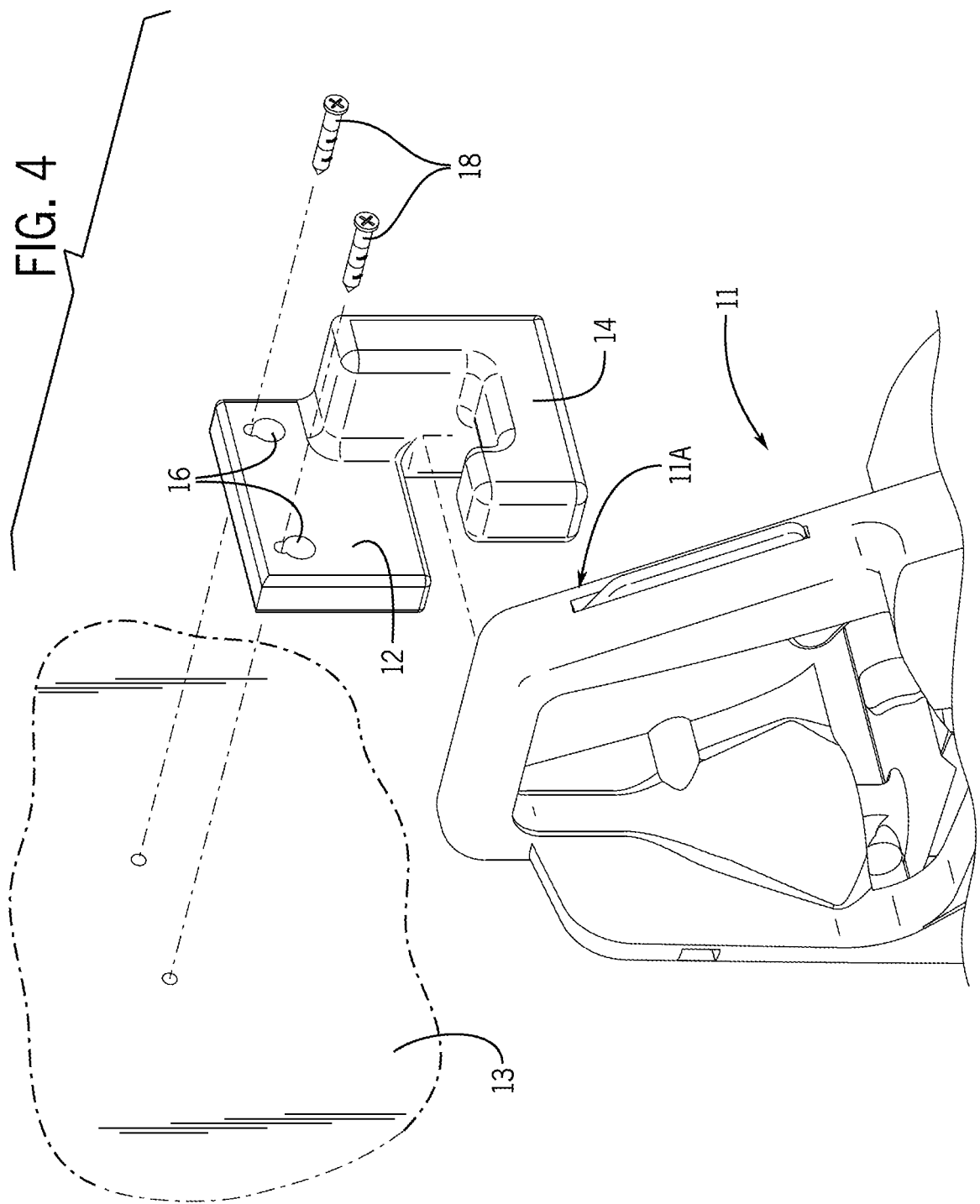
FIG. 4 is an exploded perspective view thereof.
Figure 5:
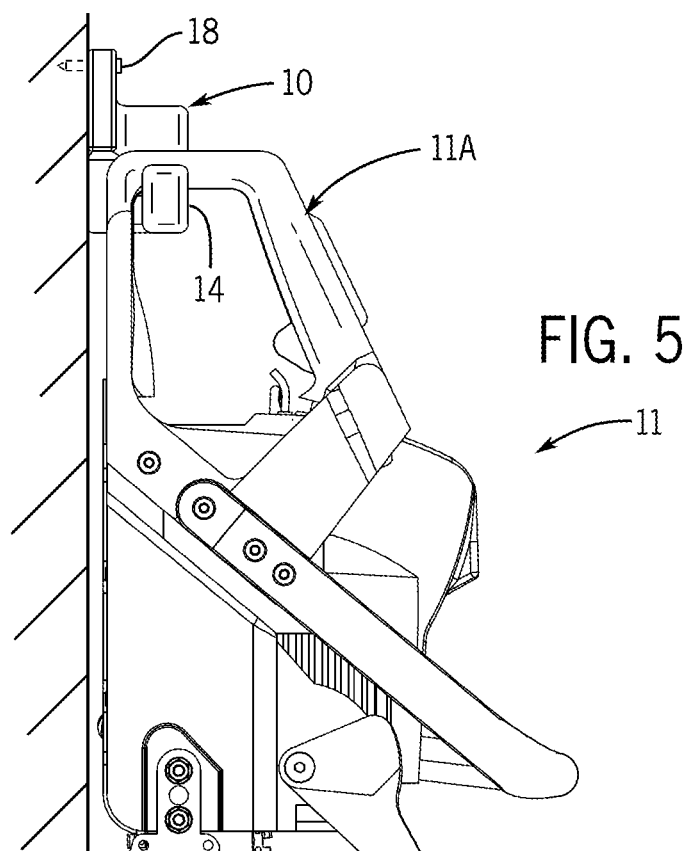
FIG. 5 is a side elevation view thereof, shown in use.
Figure 6:
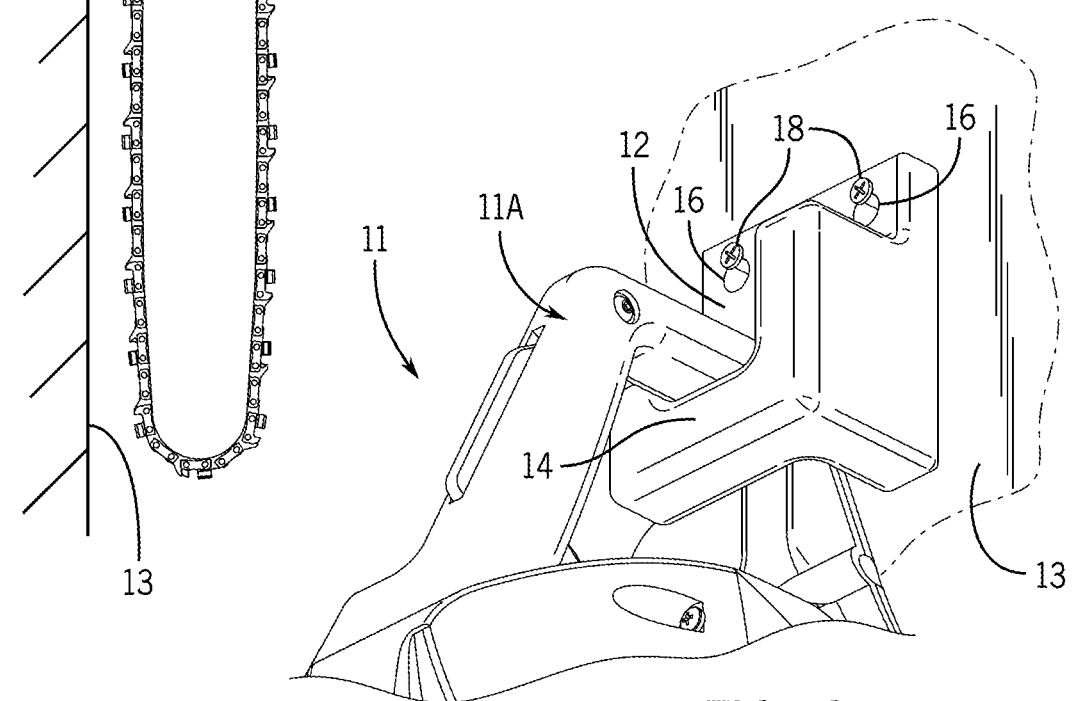
FIG. 6 is a bottom detail perspective view thereof, shown in use.
Figure 7:
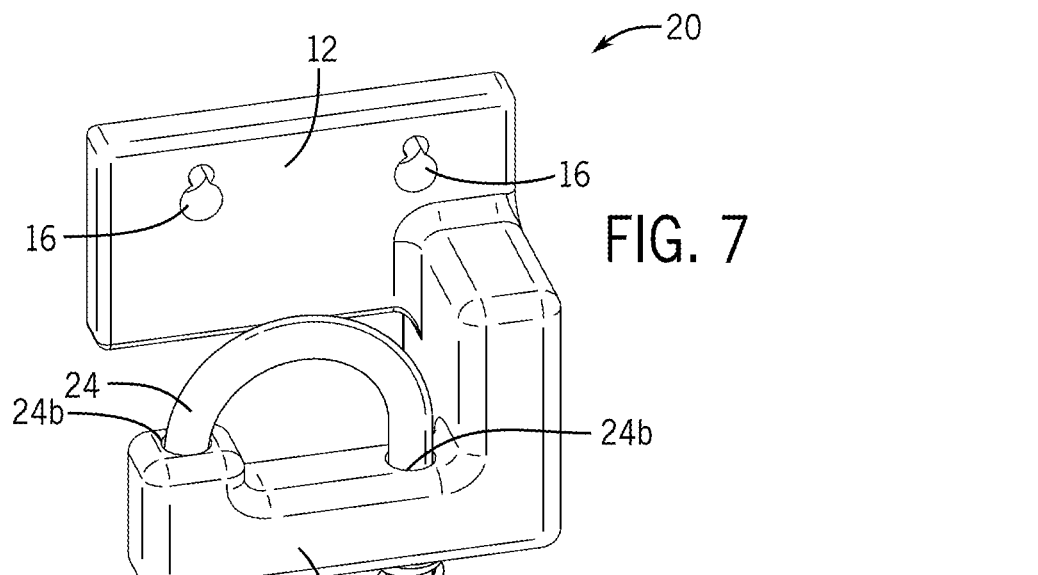
FIG. 7 is a front top perspective view of a wall mount according to another embodiment of the present invention, shown with a locking device.
Figure 8:
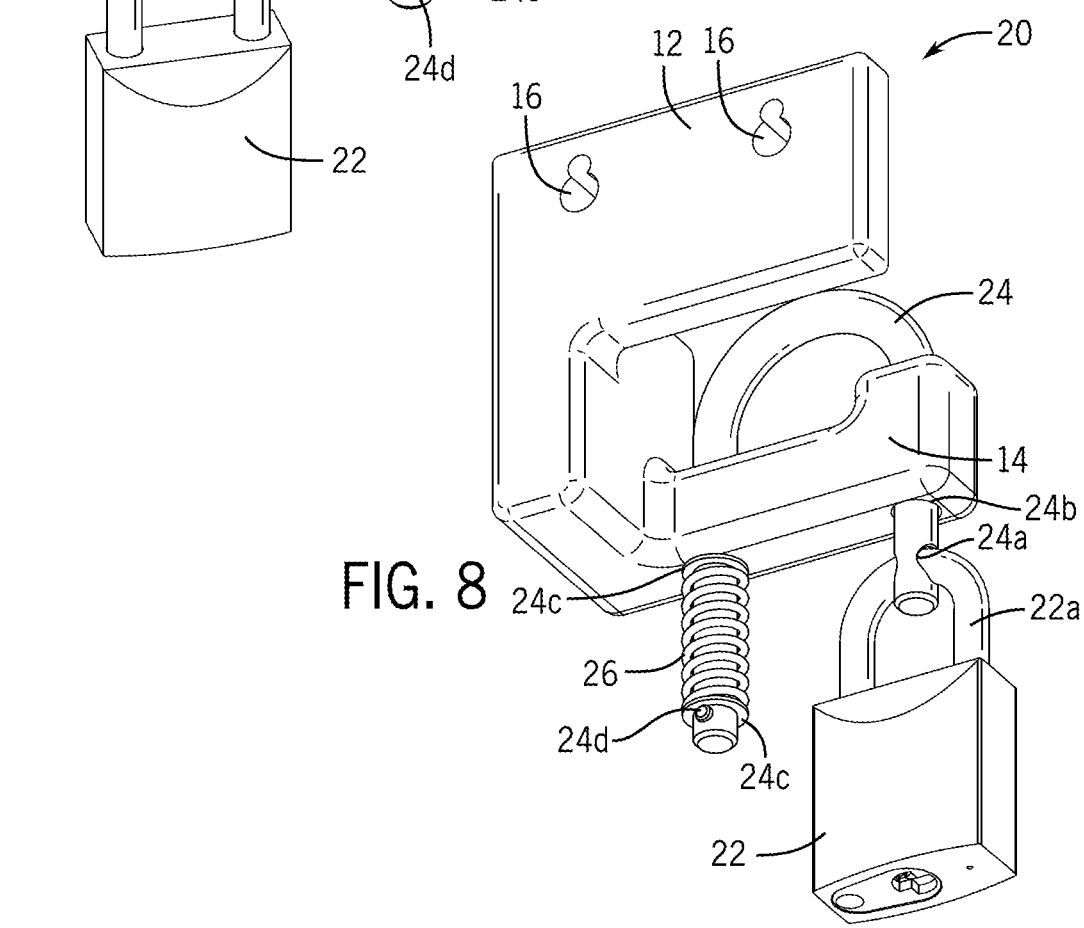
FIG. 8 is a rear bottom perspective view thereof.
Figure 9:
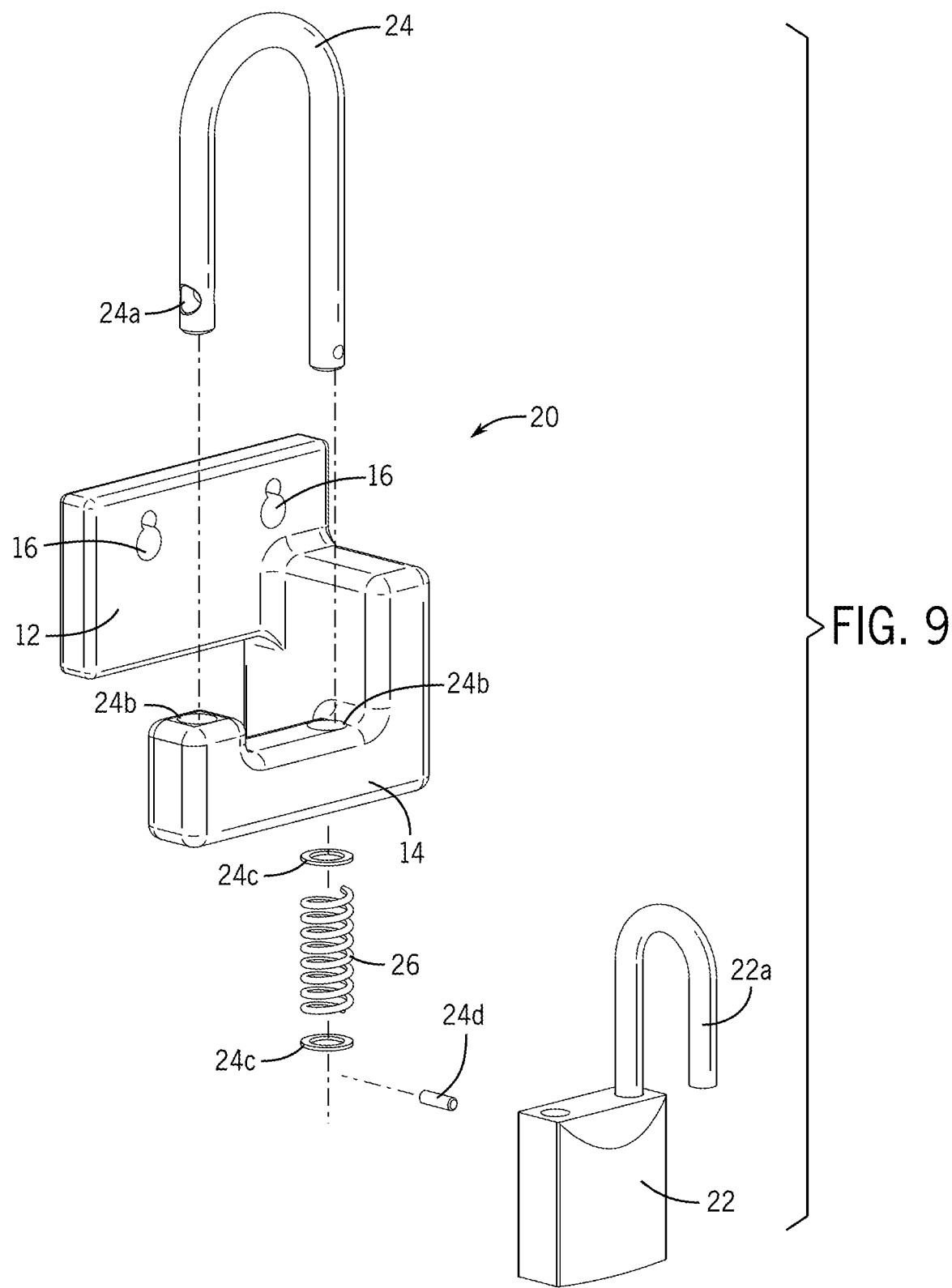
FIG. 9 is an exploded perspective view thereof.

As shown in FIG. 4, the wall mount hanger 10 may be fastened to a wall 13 with fasteners 18 such as screws passed through the mounting holes 16. FIGS. 3, 5, and 6 illustrate storage of a chainsaw 11 with a rear handle 11a suspended from the support arm 14. When the substantially planar face 12 is attached to a wall 13, the substantially J-shaped support arm is effective to support a chain saw 11 in a vertical position abutting the wall 13.

Figure 10:
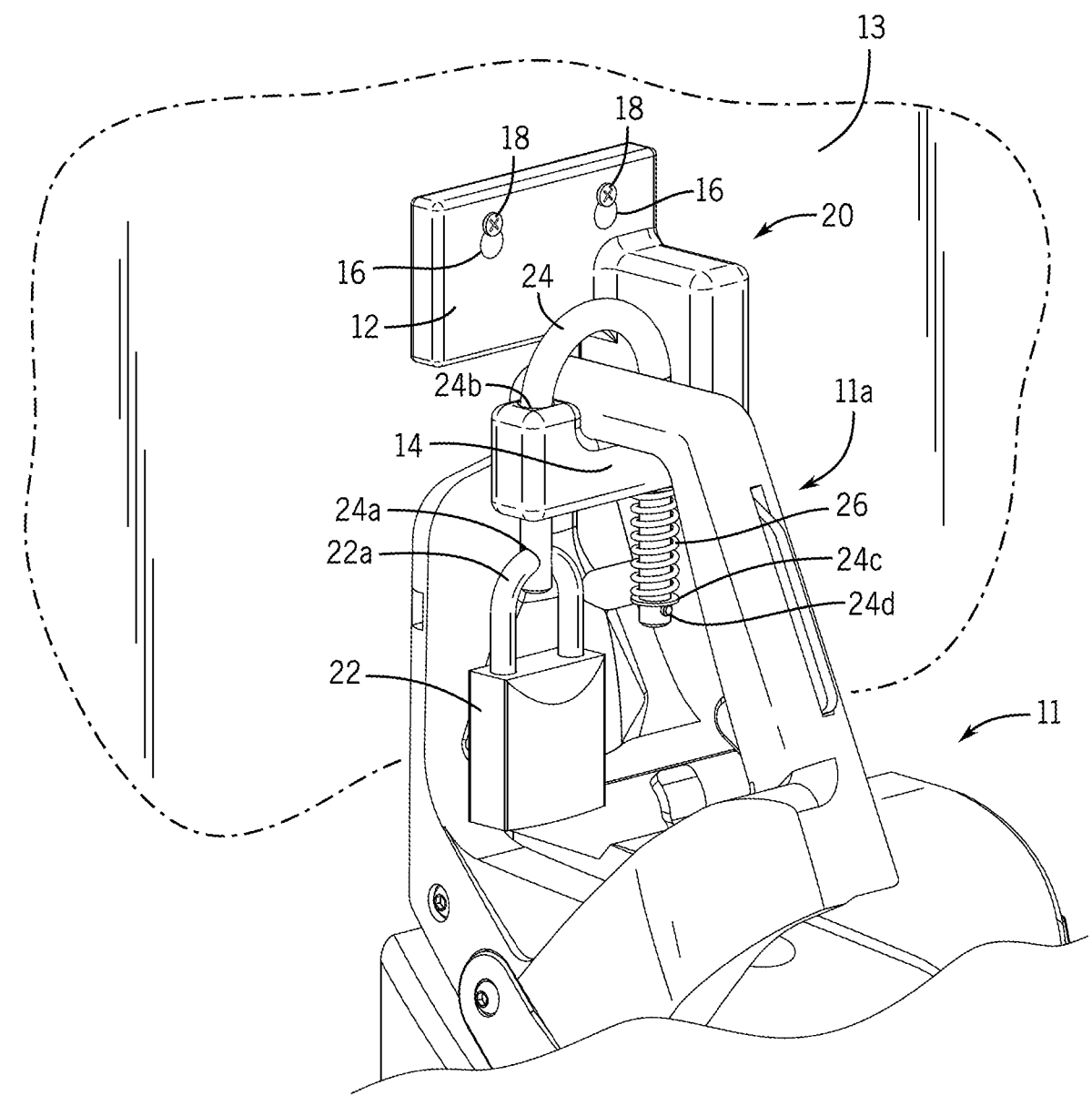
FIG. 10 is a perspective view thereof.
Figure 11:
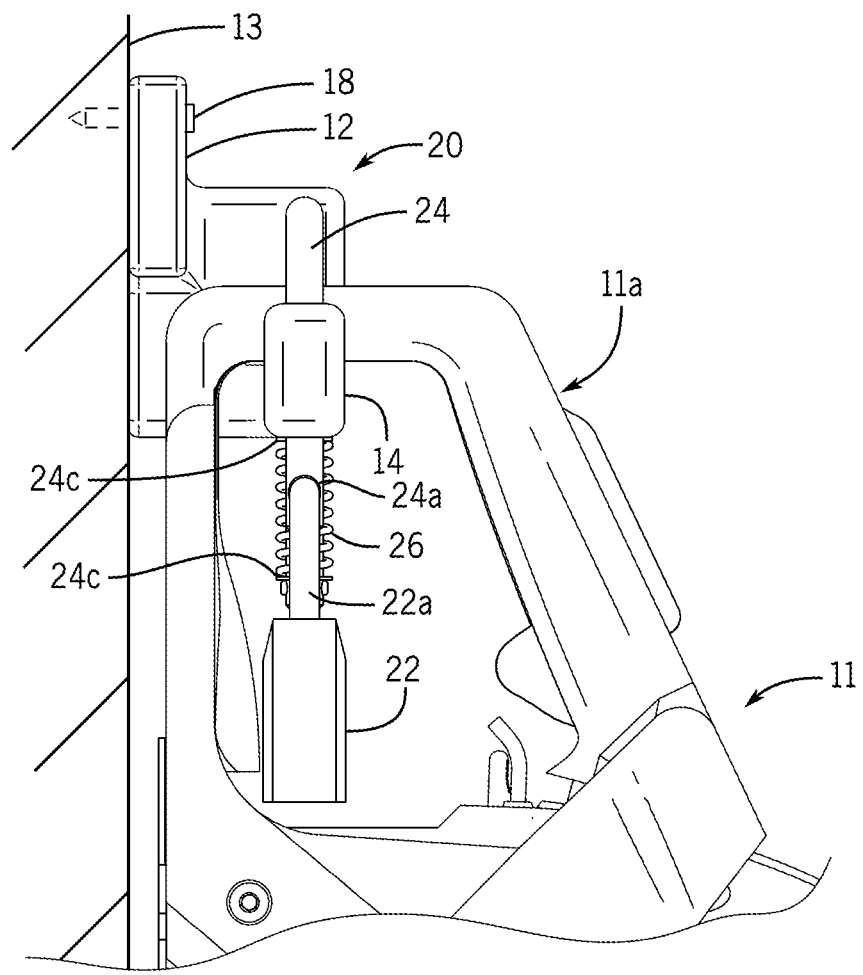
FIG. 11 is a side elevation view thereof.
Figure 12:
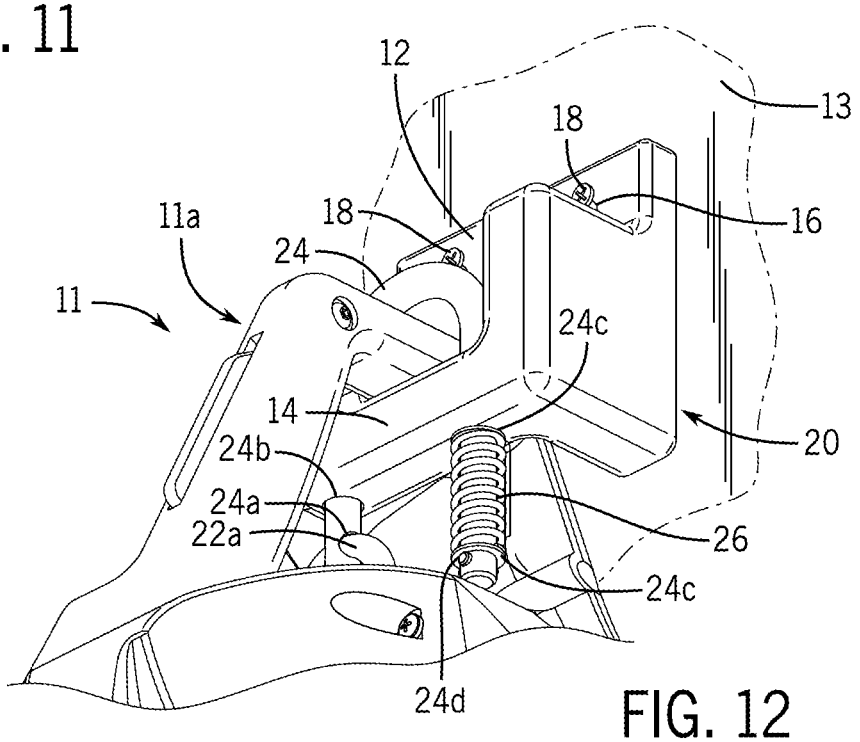
FIG. 12 is a bottom detail perspective view thereof, shown in use.

FIGS. 7 through 12 illustrate a wall mount hanger 20 according to a second embodiment having clearance holes 24b through which a locking device may be installed, such as a U-shaped bale 24 or bail rotatably and slidably secured within one of the clearance holes 24b with a spring 26 surrounding a first leg of the bail 24, held in place with washers 24c at each end, and a pin 24d. Another end of the bale 24 with a bore 24a therethrough is adapted to receive a shackle 22a or shank of a padlock 22 and may be secured within the other clearance hole 24b therewith. As shown in FIG. 10, the locking device is operative to prevent unauthorized access to a chainsaw mounted thereto.

It should be understood, of course, that the foregoing relates to exemplary embodiments of the invention and that modifications may be made without departing from the spirit and scope of the invention as set forth in the following claims.

What is claimed is:

1. A lockable chainsaw hanger comprising a substantially planar face with a substantially J-shaped support arm extending perpendicular to the substantially planar face and vertically downward therefrom, curving to form a horizontal portion parallel to and spaced laterally from the substantially planar face, and a vertical portion extending upward towards a bottom surface of the substantially planar face and spaced laterally therefrom;

wherein the substantially J-shaped support arm has a pair of apertures spaced to accommodate a U-shaped rod having a first leg and a second leg extending downward from the J-shaped support arm and wherein the first leg is slidably and rotatably secured within the J-shaped support arm.

2. The chainsaw hanger of claim 1, wherein the substantially planar face is substantially rectangular.

3. The chainsaw hanger of claim 1, wherein the substantially planar face has mounting holes formed therein.

4. The chainsaw hanger of claim 1, wherein when the substantially planar face is attached to a wall, the substantially J-shaped support arm is effective to support a chain saw in a vertical position abutting the wall.

5. The lockable chainsaw hanger of claim 1, wherein the U-shaped rod has an aperture adjacent an end of the second leg adapted to receive a lock shackle.

6. The lockable chainsaw hanger of claim 1, wherein a spring surrounds the first leg and is secured to the first leg with washers and a pin.

* * * * *